US007694277B2

(12) United States Patent
Yuknewicz et al.

(10) Patent No.: US 7,694,277 B2
(45) Date of Patent: Apr. 6, 2010

(54) CROSS VERSION CUSTOMIZATION OF DESIGN ENVIRONMENT

(75) Inventors: Paul J. Yuknewicz, Redmond, WA (US); Scott M. Wiltamuth, Seattle, WA (US); John J. Rivard, Redmond, WA (US); Bradley J. Bartz, Lynnwood, WA (US); Izydor Gryko, Sammamish, WA (US); Michael Eng, Issaquah, WA (US); William E. Hiebert, Redmond, WA (US); Baiju K. Nair, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 879 days.

(21) Appl. No.: 10/438,042

(22) Filed: May 14, 2003

(65) Prior Publication Data

US 2004/0230967 A1 Nov. 18, 2004

(51) Int. Cl.
*G06F 9/44* (2006.01)
*G06F 9/46* (2006.01)

(52) U.S. Cl. .................. 717/121; 717/164; 717/169; 719/331

(58) Field of Classification Search .................... None
See application file for complete search history.

(56) References Cited

U.S. PATENT DOCUMENTS 5,974,470 A * 10/1999 Hammond .................. 719/331
6,986,148 B2 * 1/2006 Johnson et al. ............. 719/332
7,013,331 B2 * 3/2006 Das ........................... 709/220
2002/0019972 A1 * 2/2002 Grier et al. .................. 717/3
2002/0100017 A1 * 7/2002 Grier et al. ................ 717/120

OTHER PUBLICATIONS

"Improving the reliability of commodity operating systems", Swift et al., Dec. 2003, pp. 207-222. Online retrieved at <http://delivery.acm.org/10.1145/950000/945466/p207-swift.pdf>.*

(Continued)

*Primary Examiner*—Tuan Q Dam
*Assistant Examiner*—Thuy Dao
(74) *Attorney, Agent, or Firm*—Woodcock Washburn LLP

(57) ABSTRACT

A client or Web application assembly or group of assemblies is bound to a version of shared assemblies associated with a particular targeted execution environment. The targeted execution environment (and thus the version of shared assemblies associated with it) may be selected or detected. A file such as a configuration file is automatically modified. The selected or detected execution environment may be the same as or different than the local version. The client or Web assembly is automatically bound to the targeted shared assemblies. A user interface enables the selection of a particular execution environment. Alternatively, a user interface informs of the detected targeted execution environment and enables the reconfiguration of the Web assembly. This invention provides a mechanism and process for maintaining legacy software after a new software development tool is installed, without deploying a new version of shared assemblies.

22 Claims, 6 Drawing Sheets

OTHER PUBLICATIONS

"Type-Safe linking with recursive DLLs and shared libraries", D. Duggan, Nov. 2002, pp. 711-804. Online retrieved at <http://delivery.acm.org/10.1145/590000/586093/p711-duggan.pdf>.*

"Multi-language, open-source modeling using the microsoft.NET architecture", R. Kilgore, Dec. 2002, pp. 629-633. Online retrieved at <http://delivery.acm.org/10.1145/1040000/1030541/p629-kilgore.pdf>.*

De Bruijn, M. "Reduce DLL Hell in Windows 2000, Windows 2000 Alleviates Shared File Versioning Conflicts-Mostly", *Visual Basic Programmer's Journal*, Jun. 2000, 10(7), 44-52.

Franklin, C. "Visual Studio.NET, What You Need to Know Today About the New and Upgraded Features in Visual Studio.NET 2003" *MSDN Magazine*, 2003, 18(3), 52-60.

Rashid, A. et al., "A flexible Approach for Instance Adaptation During Class Versioning", *Lecture Notes in Computer Science*, 2001, 1944, 101-113.

Stets, R.J. et al., "Component-Based APIs for Versioning and Distributed Applications", *Computer*, Jul. 1999, 32(7), 54-61.

Westfechtel, B. et al., "A Layered Architecture for Uniform Version Management", *IEEE Transactions on Software Engineering*, Dec. 2001,27(12), 1111-1133.

* cited by examiner

CROSS VERSION CUSTOMIZATION OF DESIGN ENVIRONMENT

FIELD OF THE INVENTION

The invention relates to software development and in particular to binding an application to a selected version of a set of shared assemblies.

BACKGROUND OF THE INVENTION

In the early days of programming, each application typically was self-contained. A simple application program might comprise a single executable file (frequently denoted by the extension ".exe"), while a complex application might comprise several executables chained together. Because the executables comprising a particular application could be used only by that application, the likelihood that applications would interfere with each other was remote.

Over the years, however, the size of application files grew dramatically, encouraging the sharing of code modules by applications via dynamic linking. For example, the code modules containing the functions that make an operating system work may be shared by all the applications written to run on that operating system. A file comprising a code module that can be shared in this way is sometimes called an assembly or dynamic link library and may have the extension ".dll".

Initially, file-sharing was not a problem. Most applications only used the dlls provided with the operating system or else used private (unshared) .dlls. As operating systems evolved, additional dynamic link libraries were often created, some designed to be shared among the applications developed by the operating system vendor, and others designed to be used by all developers creating applications designed to run on the operating system. Typically, these dynamic link libraries contain groups of functions that provide a standard functionality, eliminating the need for each application to implement that functionality independently.

Initially, an application that used a particular .dll might require a separate distribution of the library containing the .dll if the .dll was not included with the operating system. Software development companies frequently update the .dlls accompanying an updated version of their operating system or application to fix bugs or to add new functionality. If a new version of a .dll appeared, even if the new .dll was used in all new builds of a product, at least some of the previous distribution disks would be likely to have an older version of the .dll. Hence, frequently an individual might own several programs each using a particular dll, each program having a different version of the .dll on its distribution disks. This state of affairs can be problematic.

For example, a user may have software that uses one version of a .dll and then install software that uses a newer version of the same .dll which does not work with the first software package. Similarly, users often reinstall software— either during a system upgrade or to change configurations. In many cases a user would install software that included an older version of a particular .dll on a system that already contained a newer version. This would cause the more recently installed version of the .dll to replace the newer version of the .dll. As soon as the user attempted to run a program that required the newer version, problems might occur ranging from operational difficulties to general protection faults.

In "Component-Solution" programming, programmers take advantage of reusable, cost-effective "off the shelf" software components that implement specific functions. "Off the shelf" software components may comprise classes, custom controls and other application programming interfaces (APIs). Use of the component-solution framework for programming has resulted in the generation of hundreds of dlls that may be shared by literally thousands of applications.

If a single .dll is missing from, present in an older version in, or present in an incompatible newer version in the library of shared assemblies installed on a computing device, an application may fail. A poorly designed installation program, user error, registration error or a change in the user's PATH environment variables are a few of the ways in which this problem can occur. This suite of problems has been collectively referred to as "Dll Hell". Dll Hell is a problem of ongoing maintenance as well as an installation problem.

One approach to solving the problem of Dll Hell is to bind an application to a particular instance of its associated .dll. In this scenario, when a user installs a first program, a first .dll will be stored with the first program. If the user installs a second program using a different version of the same .dll, the old version of the .dll will remain and the new version of the .dll will be installed with the second program. Hence, installing a new application will have no impact on the operation of the old application. One way to accomplish this outcome is to associate a version number with each .dll. When an application is built, it is bound (typically at compile time) to a version of the dlls associated with the software that generates the executable. A consequence of this approach is that a deployed application program executable generated from a specific version of the software development software, has to have the specific version of the shared assemblies associated with that version of the software development software in order to run.

Now suppose someone has developed, for example, a collection of programs using a design time development environment version 1 which is associated with shared assemblies version 1. Suppose further that subsequently, someone installs a new version, version 2, of the design time development environment which is associated with a new version of the shared assemblies, shared assemblies version 2. Suppose the collection of programs developed using design time development environment version 1 is deployed to a number of desktops. Suppose further that a developer decides to fix a bug in one of the programs using design time environment version 2. The mere act of fixing a bug in one of the programs after installation of version 2 of the design time development environment will force an upgrade of the shared assemblies to version 2 of the shared assemblies on all the desktops running the collection of programs, because when the modified program is recompiled, it will be bound to version 2 of the shared assemblies. One can readily see the magnitude of the problem created if one considers that a particular application may be deployed to hundreds or thousands of desktops. It would be helpful, if there were a way to maintain older applications without having to upgrade the shared assemblies with which the older software is run, while still enabling an upgrade to a new version of a software development tool.

SUMMARY OF THE INVENTION

A client or Web application assembly or group of assemblies may be bound to a version of shared assemblies associated with a particular targeted execution environment. The targeted execution environment (and thus the version of shared assemblies associated with it) may be selected or detected. The selected or detected execution environment may be the same as or different than the local version. The client or Web executable is automatically bound to the targeted shared assemblies. A user interface enables the selection of a particular execution environment. Alternatively, for a Web application, a user interface informs of the detected targeted execution environment and enables the reconfiguration of the Web application assembly. This invention provides a mechanism and process for maintaining legacy software after a new software design environment or development tool is installed, without requiring new assemblies with to be deployed with the legacy application.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Figure 1:
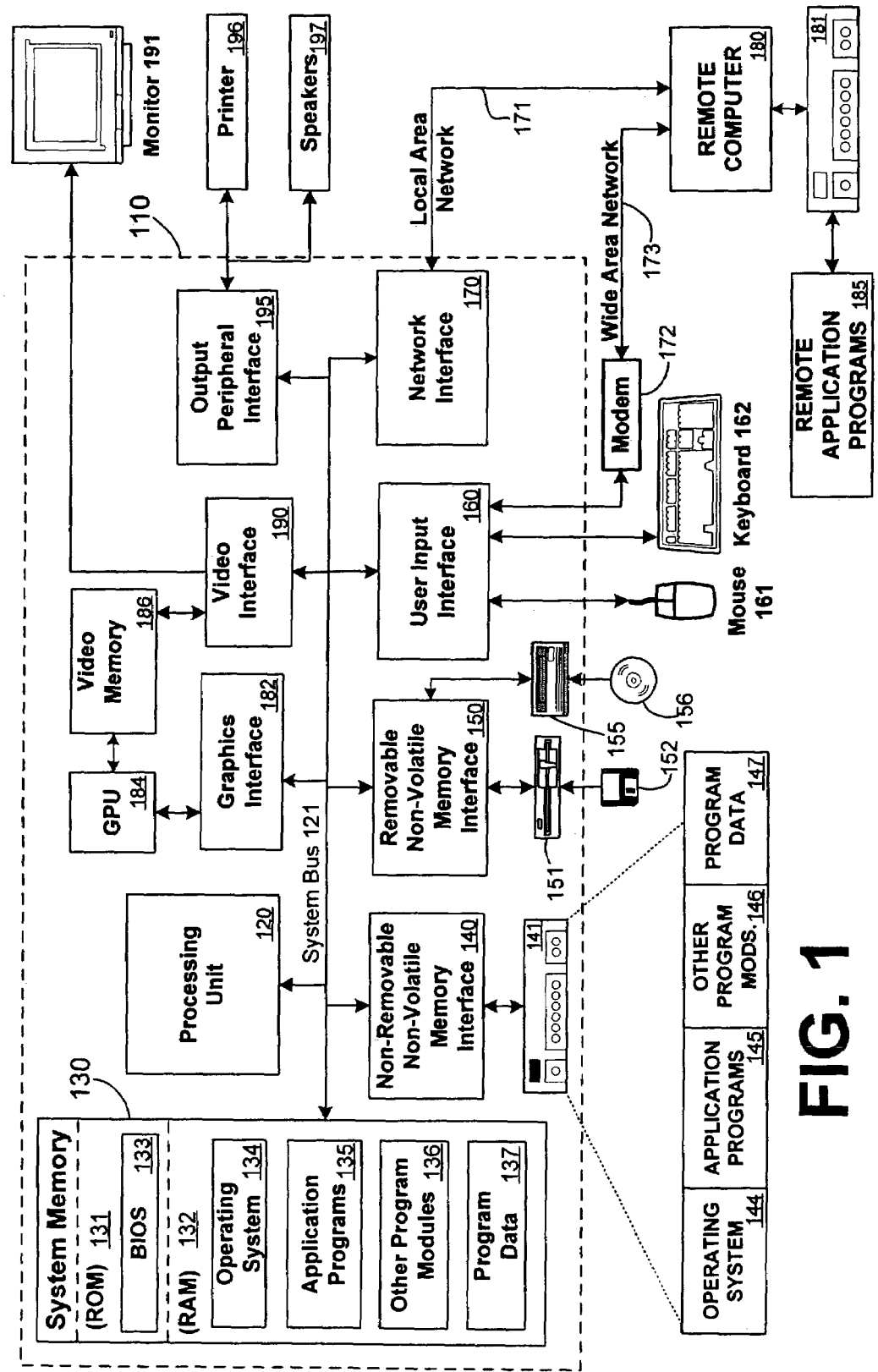
FIG. 1 is a block diagram showing an exemplary computing environment in which aspects of the invention may be implemented.

A user interface enables the selection of a execution environment associated with a version of shared assemblies to which a client application will be bound at runtime, so that existing software modified after a new or upgraded software design environment or development tool has been installed does not force the upgrade of the shared assemblies to the new version in order for the modified software to run. In one embodiment, a rebinding is performed automatically to the desired set of shared assemblies, not to each individual assembly, eliminating the need to create a plurality of binding redirect statements. A binding redirect statement overrides the binding of an assembly to an application so that instead of the application being bound to one assembly, the application is bound to another.

New software can be developed under a new (e.g., upgraded) software design environment or development tool while enabling the maintenance of existing software that uses the previously installed version of shared assemblies. The version of execution environment on which the software is desired to run (the targeted execution environment) and thus the version of shared assemblies to be bound to the application assembly, may be selected via a user interface. In one embodiment of the invention, an application configuration file is used to store the information which determines which version of shared assemblies will be bound to the application assembly. A configuration file, as used herein, is a system or application file which holds software settings that enable a particular computer to be set up or configured in a particular way. In one embodiment the information that determines which version of shared assemblies are bound to the application assembly are one or more binding redirect statements. Alternatively, the information that determines which version of shared assemblies are bound to the application assembly may be XML tags or a combination of XML tags and binding redirect statements. Multiple sections containing binding redirect statements for multiple execution environments may exist in the file.

In the case of a Web application, the execution environment determining the version of shared assemblies installed on the targeted Web server may be dynamically detected. A user may be prevented from binding the application to a set of shared assemblies that is not installed on the targeted Web server.

One or more execution environments may be selected or targeted. An application bound to a particular version of shared assemblies may be prevented from installing onto a computing device that lacks that version of shared assemblies. One copy of source code can be used to generate one or more versions of configuration files for the same application assembly. In one embodiment of the invention, the configuration file determines which set or sets of shared assemblies are bound to the application assembly.

A user interface enables a user to select one or more execution environments and thus versions of shared assemblies with which one or more application assemblies will be bound.

Exemplary Computing Environment

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1a illustrates operating system 134, application programs 135, other program modules 136, and program data 137.

The computer 110 may also include other removable/non-removable, volatile/nonvolatile computer storage media. By way of example only, FIG. 1a illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1a. The logical connections depicted in FIG. 1a include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 a illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a stand alone computing device, having programming language functionality, interpretation and execution capabilities.

Figure 2A:
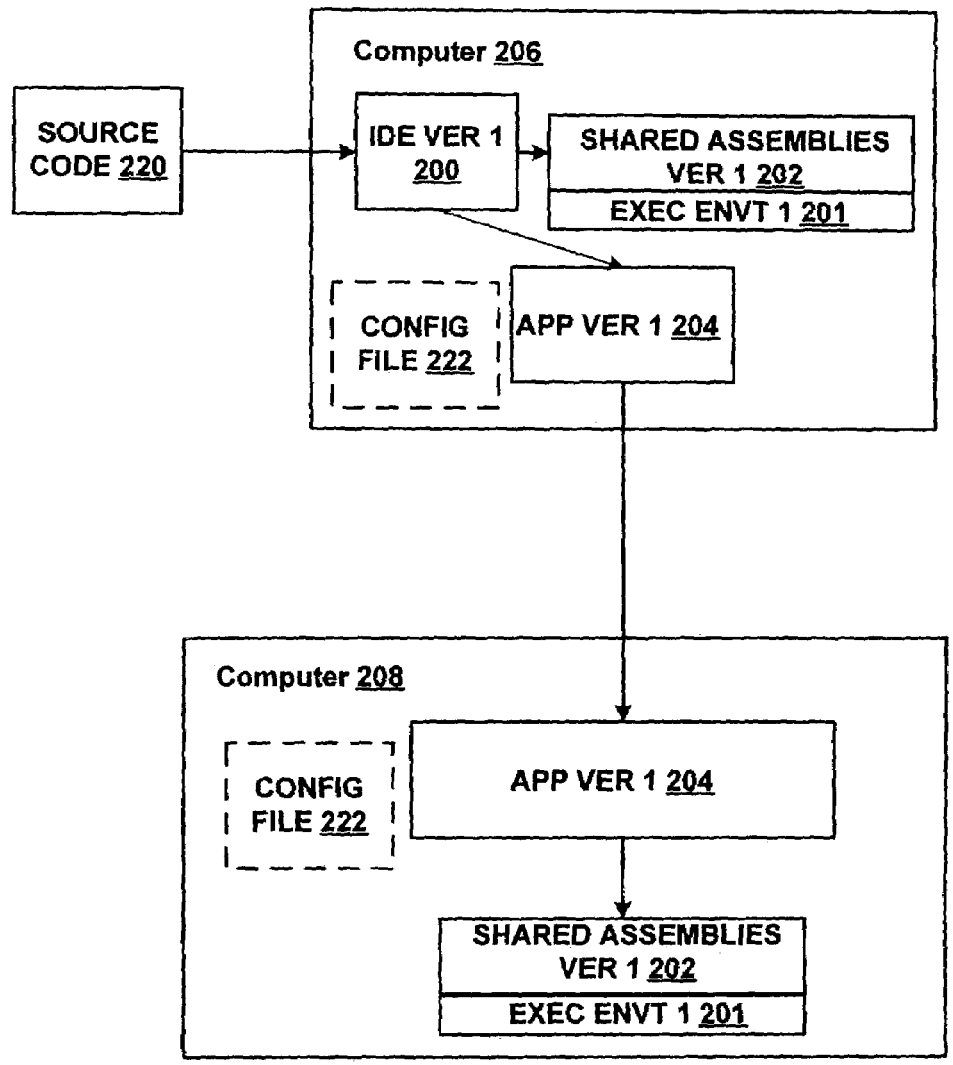
FIG. 2a is a block diagram of a system for developing software.

System and Method for Binding Executables to a Selected or Detected Execution Environment Associated with a Particular Version of Shared assemblies FIG. 2a is a block diagram of a system for developing software. In FIG. 2a computer 206 represents a computer such as but not limited to a development computer on which applications, such as application assembly version 1, (represented in FIG. 2a as "APP VER 1", reference numeral 204), bound to shared assemblies library 1 (represented in FIG. 2a as SHARED ASSEMBLIES VER 1, reference numeral 202) may be developed. Application version 1 204 may or may not be associated with a configuration file, such as configuration file 222. Application assembly version 1 204 may be created from source code 220 using a design environment (DE). A design environment may include one or more compilers or interpreters, one or more design tools and the like. One such design environment is represented by, but not limited to, an integrated design environment (IDE) version 1 200. A design environment may generate from source code 220 executable code capable of being run in an execution environment or may generate an intermediate form of code that is interpreted or compiled again and run by the execution environment. An execution environment may include elements required in order to run the assembly produced by the design environment from the source code 220. The execution environment may include elements that produce native code from a non-device-specific intermediate language code. An exemplary execution environment is represented in FIG. 2a by execution environment 1 201 associated with shared assemblies version 1 202. IDE version 1 200 may represent, for example, MICROSOFT VISUAL STUDIO .NET2002, or DREAMWEAVER by MACROMEDIA or BORLAND C++ BUILDER STUDIO 6 or any other software development/design tool, compiler or environment. Execution environment 1 201 may, for example, represent MICROSOFT .NET FRAMEWORK 1.0 or a JAVA environment or any other execution environment. Shared assemblies version 1 202 may represent a shared assembly or a group of shared assemblies with which IDE version 1 200 binds application assembly version 1 204 at compile time. Application assembly version 1 204 may require shared assemblies version 1 202 in order to run. Application assembly version 1 204 may be loaded, along with shared assemblies version 1 202 and execution environment 201, onto a computer 208 (e.g., a user computer) and run.

Figure 2B:
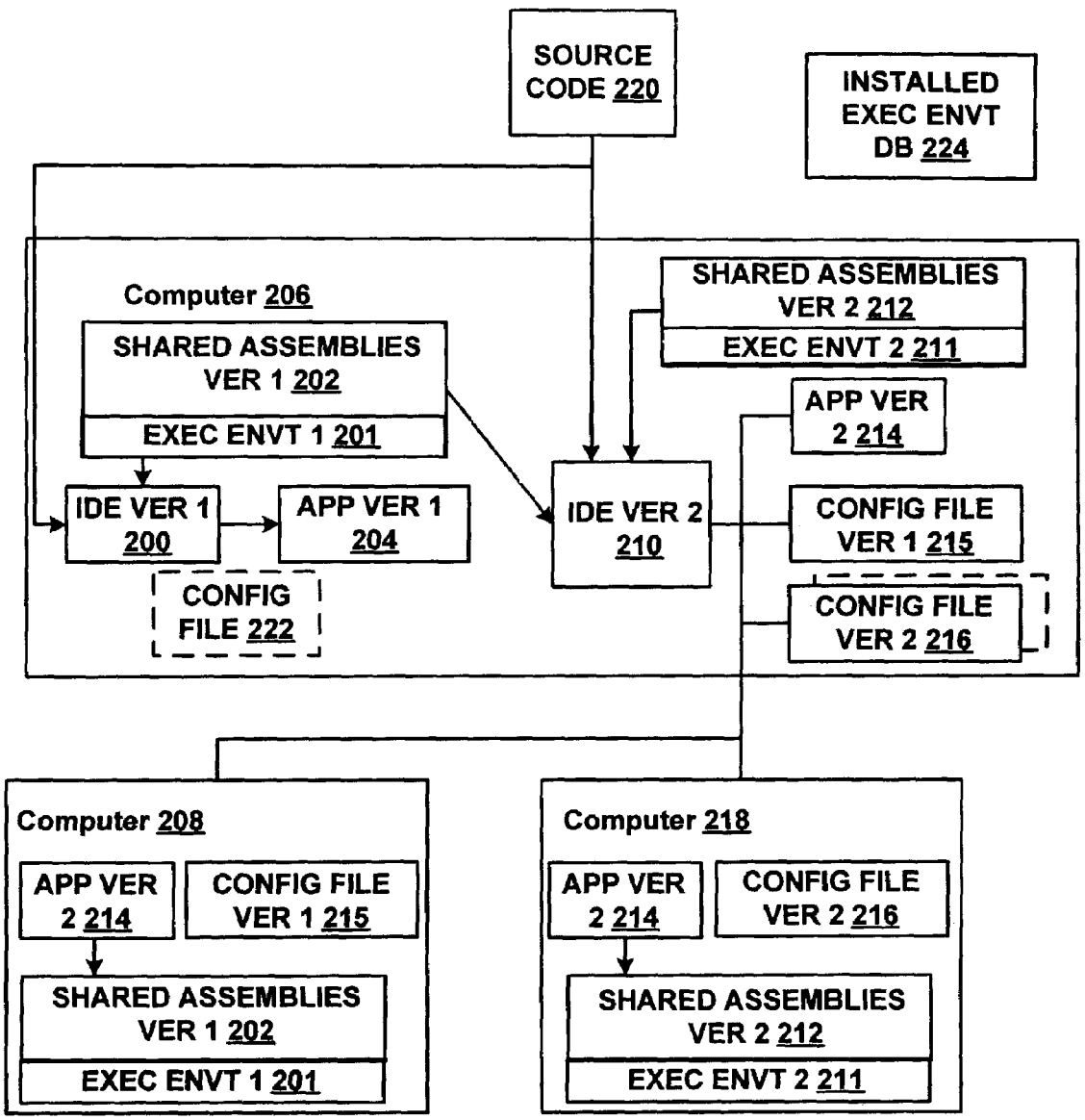
FIG. 2b is a block diagram of an exemplary system for targeting at least one of a plurality of execution environments and their associated versions of shared assemblies with which to bind an application assembly or group of application assemblies in accordance with one embodiment of the present invention.

Referring now to FIG. 2b, suppose that a new software design environment or development tool, such as but not limited to IDE version 2 210, is installed on computer 206. IDE version 2 210 may be installed side-by-side with IDE version 1 200, as shown in FIG. 2b or may replace IDE version 1 200. IDE version 2 210 in accordance with one embodiment of the invention, may, by default, be associated with shared assemblies version 2 212 and execution environment 2 211. Thus source code 220 if opened by IDE version 2 210 may produce an application assembly that is, by default, bound with shared assemblies version 2 212, generating application assembly version 2 bound to shared assemblies version 2 212 (represented in FIG. 2b by "APP VER 2", reference numeral 214). Shared assemblies version 2 212 may represent a shared assembly or a library of shared assemblies with which IDE version 2 210 by default binds application assembly version 2 214 at compile time.

In accordance with one embodiment of the invention, however, the application assembly generated from source code 220 may be bound with shared assemblies version 1 202 or the application assembly generated from source code 220 may be bound with shared assemblies version 2 212 or the application assembly generated from source code 220 may be bound with both versions of shared assemblies (202 and 212), as discussed in more detail below.

A system or other suitable file, such as a configuration file, (e.g., configuration file version 1 215 or configuration file version 2 216, etc.), may be accessed by IDE version 2 210 to determine the version of shared assemblies to be bound to the application assembly to be generated. In one embodiment of the invention, the configuration file (e.g., configuration file version 1 215 or configuration file version 2 216, etc.) is an XML file. The configuration file may be an application or a Web configuration file. Installed execution environment datastore 224 in one embodiment of the invention includes information used to create or modify the configuration file (configuration file version 1 215 or configuration file version 2 216, etc.) and may be a file or database.

It will be understood by one skilled in the art that although the example depicted in FIGS. 2a and 2b illustrate an existing piece of source code 220 which is modified or at least opened in IDE version 2 210, the system thus described is equally applicable to source code which is newly written (using for example, a "create" option), or copied from another source.

IDE version 2 210 may represent a new version of IDE version 1 200 or may represent a new software development environment, tool, compiler or the like. In one embodiment of the invention, IDE version 1 200 represents MICROSOFT VISUAL STUDIO .NET 2002, IDE version 2 210 represents MICROSOFT VISUAL STUDIO NET 2003, execution environment 1 201 represents MICROSOFT .NET COMMON LANGUAGE RUNTIME 1.0, execution environment 2 211 represents MICROSOFT .NET COMMON LANGUAGE RUNTIME 1.1, shared assemblies version 1 represents the shared assemblies associated with VISUAL STUDIO NET 2002 and COMMON LANGUAGE RUNTIME 1.0: .NET FRAMEWORK 1.0 and shared assemblies version 2 represents the shared assemblies associated with VISUAL STUDIO .NET 2003 and .NET COMMON LANGUAGE RUNTIME 1.1: NET FRAMEWORK 1.1, however, as described above, it will be understood that the invention is not so limited. IDE versions 1 and 2 may equally represent, for example, DREAMWEAVER by MACROMEDIA or BORLAND C++ BUILDER STUDIO, execution environments 1 and 2 may represent, for example, JAVA or other execution environments, and shared assemblies versions 1 and 2 may represent, for example, the libraries associated with DREAMWEAVER by MACROMEDIA or BORLAND C++ BUILDER STUDIO and the like. In one embodiment of the invention, the shared assemblies exist in a device-independent intermediate language, which may comprise interpreted binary code. Alternatively, the shared assemblies may exist in a native (device-specific) binary code. The shared assemblies may be referred to as assemblies or executables and may include code modules such as classes, custom controls and the like, representing functionalities and so on that may be useful in the development of applications.

Application assembly version 2 214 may be loaded onto a computer such as exemplary computer 208 (e.g., a user computer) and run. Computer 208 may already have shared assemblies version 1 202 loaded onto it or shared assemblies version 1 202 may be loaded concurrently with application assembly version 2 214. Computer 208 may already have execution environment 1 201 loaded onto it or execution environment 1 201 may be loaded concurrently with application assembly version 2 214.

Similarly application assembly version 2 214 may be loaded onto a computer such as computer 218 (e.g., a user computer) and run. Computer 218 may already have shared assemblies version 2 212 loaded onto it or shared assemblies version 2 212 may be loaded concurrently with application assembly version 2 214. Computer 218 may already have execution environment 2 211 loaded onto it or execution environment 2 211 may be loaded concurrently with application assembly version 2 214.

Computer 208 and/or computer 218 may be a client or may be a Web server hosting an application for one or more clients (not shown) or may be any other type of server capable of running an execution environment as discussed above, such as a SQL server or any of the commonly known servers typically found in a business, home or office setting.

Figure 3:
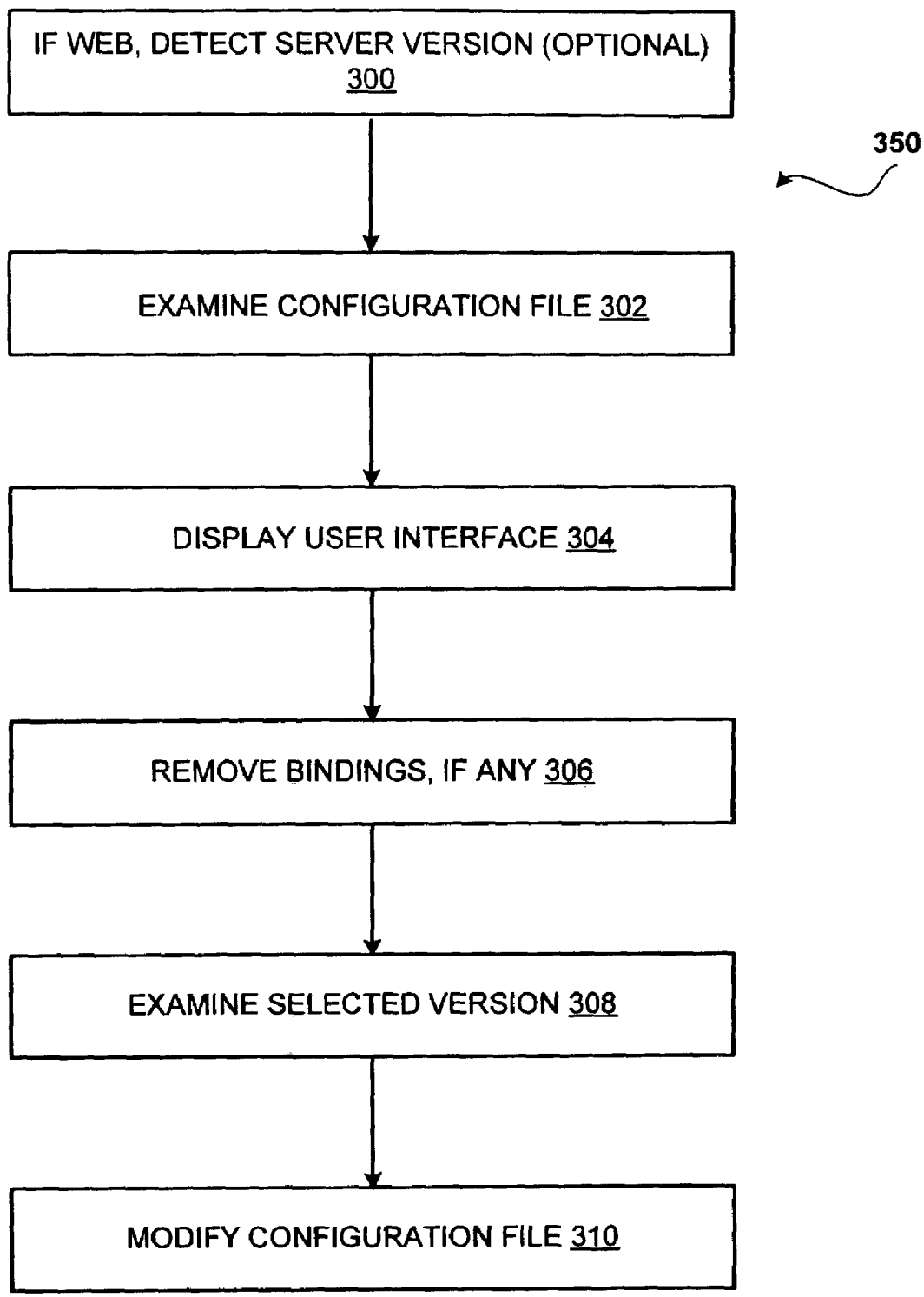
FIG. 3 is a flow diagram of an exemplary method for selecting a version of a execution environment, thus determining the version of shared assemblies with which a Web or client assembly is to be bound in accordance with one embodiment of the invention.

FIG. 3 is a flow diagram of an exemplary method 350 for binding a selected or detected version of execution environment and thus shared assemblies to an application assembly in accordance with one embodiment of the invention.

At step 300, if the application is a Web application, the version of the execution environment running on the Web server may be detected. The version of the execution environment of the Web server may be detected from Web page header information or may be deduced from one or more attributes known to be associated with a particular version of the execution environment.

At step 302, in one embodiment of the invention, a user interface may be initialized according to settings stored in the configuration file. To initialize the interface, the application configuration file (for client projects) or Web configuration file (for Web projects) or other suitable file may be examined. If no application configuration file exists or there is no entry for the supported execution environments, a default option may be selected. In the exemplary user interface of FIG. 4b, the MICROSOFT NET FRAMEWORK v1.1 radio button is checked in this case.

Figure 4A:
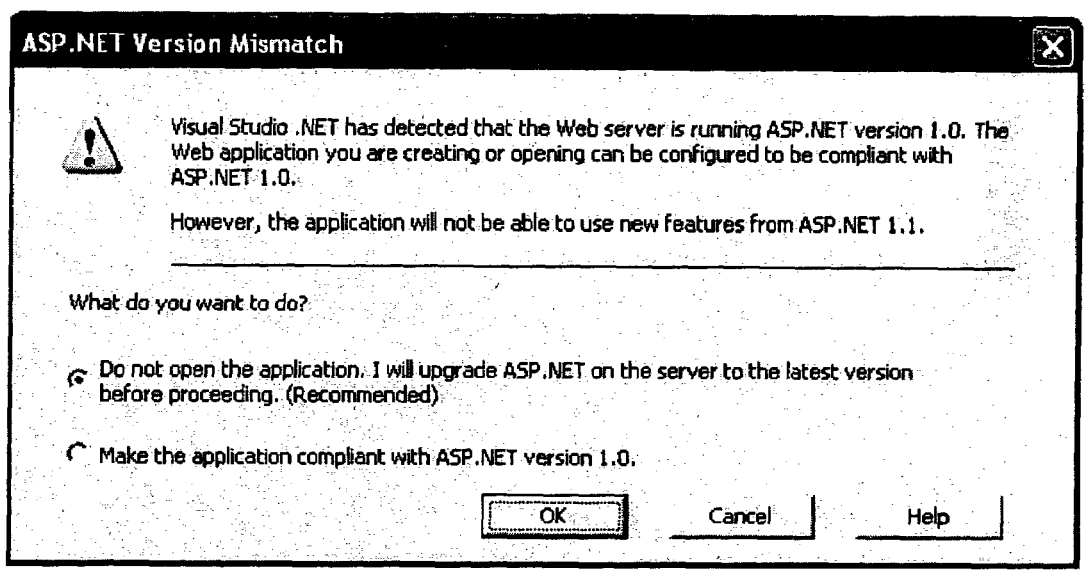
FIG. 4a is a screen shot of an exemplary user interface for selecting the configuration of a Web application.

At step 304, the initialized user interface such as a dialog box or other suitable user interface is displayed. For a Web application, if the version of the execution environment running on the Web server is execution environment version 1, a user interface such as the one illustrated in FIG. 4a may be displayed. The exemplary user interface illustrated in FIG. 4a provides an option to stop to allow the Web server to be upgraded to a higher version or to build the application using the shared assemblies version 1 associated with execution environment version 1. If the upgrade option is not chosen, and the version of the execution environment detected on the targeted Web server is version 1, the application will be bound to the version 1 shared assemblies. If the version of the execution environment detected on the targeted Web server is version 2, the application will be bound to the version 2 shared assemblies.

Figure 4B:
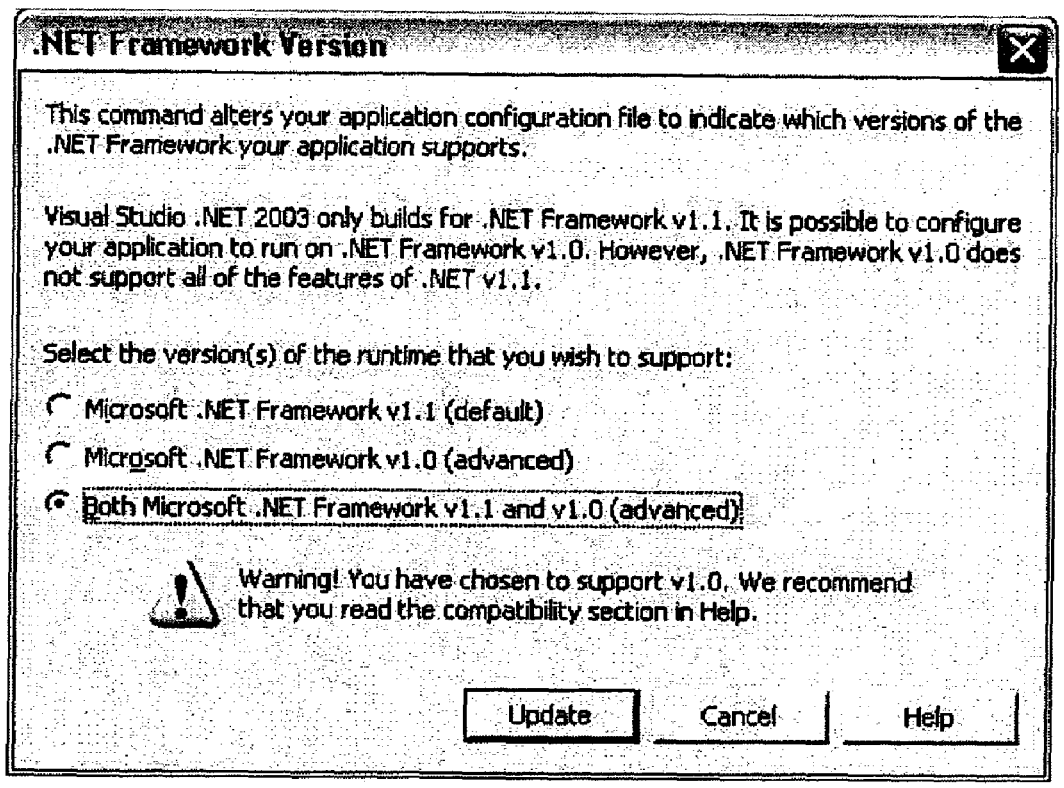
FIG. 4b is a screen shot of an exemplary user interface for selecting a targeted version of execution environment and its associated shared assemblies in accordance with one embodiment of the present invention.

For a client application, in one embodiment of the invention, the user interface provides a series of options such as radio buttons, check boxes or other suitable means for displaying options and accepting at least one selection. An exemplary screen shot is illustrated in FIG. 4b for a client application, in which an explanatory message is displayed followed by the following radio buttons:

Microsoft NET Framework v1.1 (default)
Microsoft .NET Framework v1.0 (advanced)
Both Microsoft .NET Framework v1.1 and v1.0 (advanced)

It will be understood that although the exemplary interface displays three options, the invention as contemplated is not so limited: any suitable number of options and supported execution environments may be displayed and selected. Furthermore, the options displayed may be dynamically determined from a database or file containing the versions of execution environments that can be targeted. For example a file (e.g., InstalledRuntimes.xml) including a list of execution environments that can be targeted may be loaded, each installed execution environment element may be examined, and for each element the function may retrieve information such as but not limited to the version number of the execution environment and the friendly name of the execution environment. This information may be returned and displayed in the dialog box.

At step 306, if an existing application configuration file was found, any existing binding redirect statements may be removed. For each version of the execution environment being targeted, each binding redirect that represents a component that is found in the installed execution environment database is removed. Any elements not found in the installed execution environments database are assumed to have been manually added and thus are not removed.

At step 308, the selected version of the framework is examined. In one embodiment of the invention, a parameter in a set configuration execution environment bindings function called by the dialog box is passed. In the exemplary user interface of FIG. 4a, if MICROSOFT .NET Framework v1.0 (advanced) is selected, 1.0 will be passed, if MICROSOFT .NET Framework v1.1 (default) is selected, 1.1 will be passed and if Both Microsoft .NET Framework v1.1 and v1.0 (advanced) is selected, both 1.0 and 1.1 will be passed.

At step 310 the application configuration file is modified in accordance with the option selected. The configuration file in one embodiment of the invention is an XML file that travels with the client application. The configuration file may be used to specify aspects of the application, including assembly rebindings and may include one or more binding redirect statements. A binding redirect statement may comprise one or more statements having the following general format or other suitable format:

<bindingRedirect   oldVersion="system.windows.forms, version=0.9999" newVersion="system.windows.forms, version=1.0"> that is, the binding redirect statement instructs the execution environment to use the version of the shared assembly "system.windows.forms" associated with the 1.0 version of the execution environment instead of whatever version of "system.windows.forms" was originally bound to the executable. One binding redirect statement may be required for each shared assembly, hence a number of binding redirect statements may be included within the configuration file. The configuration file may also or alternatively include one or more tags, wherein each tag is associated with a supported or required execution environment. For example, a line in the configuration file such as:
<supported runtime 1.0> would indicate that application assemblies should be associated at design time to the shared assemblies associated with execution environment version 1.0. At runtime these shared assemblies will be bound to the application assemblies. Similarly, the line:
<supported runtime 1.1> would indicate that the shared assemblies associated with execution environment version 1.1, should be bound to the application assemblies at runtime, while the combination of lines:
<supported runtime 1.1>
<supported runtime 1.0> would indicate that application assemblies should be associated at design time to both the shared assemblies associated with execution environment version 1.0 and version 1.1, thus enabling the system to choose the appropriate execution environment in which to run, according to predefined criteria. In one embodiment of the invention, at runtime, the execution environment determines which execution environment is available from the configuration file. Additional tags such as but not limited to:
<requiredRuntime version="v1.0"/> may also be required. It will be understood that the number of execution environments supported, the tag names and the version numbers used are exemplary only. The contemplated invention is not limited to a particular number of execution environments supported, the tag names used or the version numbers used. Hence the particular version of configuration file that is generated is determined by the target execution environment selection(s) made (e.g., via the user interface).

In one embodiment of the invention, one or more files or datastores (e.g., the installed execution environments database) are maintained to keep track of what version numbers are associated with the old version of shared assemblies, the version of the shared assemblies to be rebound to, the version numbers associated with the various execution environments, and the different binding possibilities. The binding redirect statements placed in the configuration file thus may be data-driven, by accessing and modifying a separate file or datastore. In one embodiment of the invention the datastore is an XML file. The above functionality may be provided as a service, enabling third party plug-ins to have access to the same information.

For each version of the execution environment being targeted, the installed execution environments datastore may be examined to see if the datastore has any binding redirects for the version of the execution environment being targeted. If any binding redirect statements are present, the binding redirect statements may be inserted into the application configuration or Web configuration file. In one embodiment of the invention, required execution environment and supported execution environment tags are modified or inserted into the application configuration file even if no binding redirect statements are present in the installed execution environments datastore for the version of the execution environment being targeted. If no application configuration file is present, an appropriate application configuration file may be added to the application project.

Thus, to determine the appropriate binding redirect statements to be inserted into the configuration file, in one embodiment of the invention, the installed execution environments datastore is loaded. In one embodiment of the invention, the installed execution environment file is an XML file comprising a number of sections, one section for each installed version of shared assemblies. The section of the installed execution environments datastore corresponding to the selected version of shared assemblies to be bound to the executable is found. The section corresponding to the version of shared assemblies may include a list of these binding redirect statements. The binding redirect statements may be rewritten verbatim to the application configuration file or may undergo a syntactical transformation before being written to the application configuration file.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A method for selecting a set of shared assemblies with which an assembly is bound at runtime, wherein the assembly is able to execute in at least one of a first execution environment and a second execution environment differing from the first execution environment, the first execution environment associated with a first set of shared assemblies and the second execution environment associated with a second set of shared assemblies, the method comprising:

receiving a targeted execution environment selection during development or installation of the assembly to select the first or second execution environment; and automatically modifying a configuration file so that the assembly is bound with a version of shared assemblies associated with the received targeted execution environment, wherein the configuration file is modified by a software design environment associated with the second execution environment, which allows maintenance of the assembly by the software design environment without requiring deployment of the second set of shared assemblies, the configuration file comprising a binding redirect statement, a supported runtime tag, and a required runtime tag.

2. The method of claim 1, wherein the configuration file is modified based on an execution environment file comprising information associating the first execution environment with a first version of a shared assembly and the second execution environment with a second version of a shared assembly.

3. The method of claim 2, wherein the execution environment file comprises the shared assemblies associated with the first execution environment, the shared assemblies associated with the second execution environment, and a version number for each shared assembly.

4. The method of claim 1, wherein the configuration file comprises an XML file.

5. The method of claim 1, wherein the configuration file contains at least one of a section for the first execution environment and a section for the second execution environment.

6. The method of claim 1, wherein the targeted execution environment is detected by determining an installed execution environment on at least one remote computing device.

7. The method of claim 6, wherein the at least one remote computing device is one of a Web server and a structured query language (SQL) server.

8. The method of claim 1, wherein an assembly that is bound to an uninstalled version of shared assemblies is prevented from loading onto a remote computing device.

9. A computing system, embedded at least in part in a computer readable storage medium, for selecting a set of shared assemblies to execute with an application assembly, wherein the application assembly is able to execute in at least one of a first execution environment and a second execution environment differing from the first execution environment, the first execution environment associated with a first set of shared assemblies and the second execution environment associated with a second set of shared assemblies, the computing system comprising:

a file associated with the application assembly, the file determining at least one of the first set of shared assemblies and the second set of shared assemblies with which to bind the application assembly, the file comprising a binding redirect statement, a supported runtime tag, and a required runtime tag; and a software design environment associated with the second set of shared assemblies, the software design environment for creating or modifying the application assembly and the file, wherein the set or sets of shared assemblies to be bound to the application assembly is selected during development or installation of the application assembly and the selection is stored in the file associated with the application assembly, which allows maintenance of the application assembly by the software design environment without requiring deployment of the second set of shared assemblies.

10. The system of claim 9, wherein the first set of shared assemblies comprises a first version and the second set of shared assemblies comprises a second version.

11. The system of claim 10, wherein the application assembly is bound to the first version of shared assemblies by targeting the first execution environment.

12. The system of claim 10, wherein the application assembly is bound to the second version of shared assemblies by targeting the second execution environment.

13. The system of claim 9, further comprising an installed execution environments datastore for specifying version numbers of shared assemblies associated with the first execution environment.

14. The system of claim 13, wherein the installed execution environments datastore comprises an extensible markup language (XML) file.

15. The system of claim 9, further comprising an installed execution environments datastore for specifying version numbers of shared assemblies associated with the second execution environment.

16. The system of claim 15, wherein the installed execution environments datastore comprises an XML file.

17. The system of claim 9, wherein the file is a configuration file.

18. The system of claim 9, further comprising a first computer for generating the application assembly and a second computer for executing the application assembly.

19. The system of claim 18, wherein the version of execution environment running on the second computer is automatically detected, where the first execution environment is a first version and the second execution environment is a second version of the execution environment.

20. The system of claim 19, wherein in response to detecting the version of execution environment executing on the second computer, the corresponding version of shared assemblies are bound to the application assembly.

21. A user interface, embedded at least in part in a computer readable storage medium, comprising a series of choices for targeted execution environments including different first and second execution environments associated, respectively, with first and second sets of shared assemblies, the user interface providing input of the targeted execution environment to a software design environment during development or installation of an application assembly, the input determining the version of shared assemblies to which an assembly generated by the software design environment is bound, the input causing a file associated with the assembly to comprise a binding redirect statement, a supported runtime tag, and a required runtime tag, wherein the software design environment is associated with the second set of shared assemblies, which allows maintenance of the assembly by the software design environment without requiring deployment of the second set of shared assemblies.

22. A computer-readable storage medium comprising computer-executable instructions for selecting a set of shared assemblies with which an assembly is bound at runtime, wherein the assembly is able to execute in at least one of a first execution environment and a second execution environment differing from the first execution environment, the first execution environment associated with a first set of shared assemblies and the second execution environment associated with a second set of shared assemblies, the computer-executable instructions:

prompting for a selection of the first or second execution environment during development or installation of an application assembly, and in response to a selection, automatically modifying a configuration file so that the application assembly is bound with a set of shared assemblies associated with the selected execution environment; and modifying the configuration file to comprise a binding redirect statement, a supported runtime tag, and a required runtime tag, and modifying the configuration file based on an execution environment file comprising a binding redirect statement associating a first version of a shared assembly with a second version of a shared assembly, wherein the configuration file is modified by a software design environment associated with the second execution environment, which allows maintenance of the assembly by the software design environment without requiring deployment of the second set of shared assemblies.

\* \* \* \* \*